UNITED STATES PATENT OFFICE.

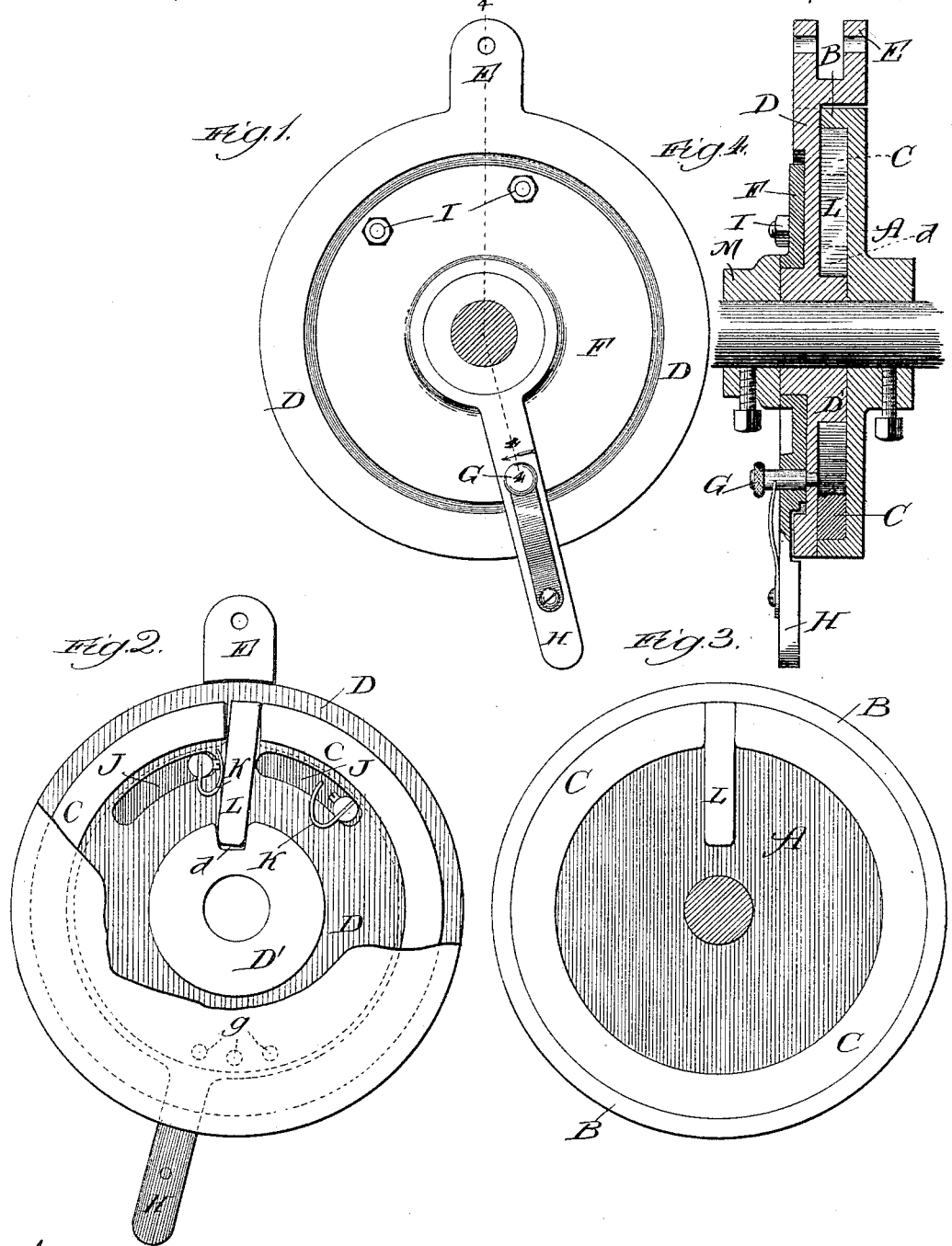

SAMUEL E. NUTTING, OF CHICAGO, ILLINOIS, ASSIGNOR TO THE NUTTING ELECTRIC MANUFACTURING COMPANY, OF SAME PLACE.

FRICTION-CLUTCH.

SPECIFICATION forming part of Letters Patent No. 453,587, dated June 2, 1891.

Application filed August 7, 1890. Serial No. 361,344. (No model.)

*To all whom it may concern:*

Be it known that I, SAMUEL E. NUTTING, a citizen of the United States, residing at Chicago, Illinois, have invented certain new and useful Improvements in Friction-Clutches, of which the following is a specification.

The object of my improvement is to make a friction-clutch by which a reciprocating movement may be converted into a rotary movement; and my invention consists in the features and details of construction hereinafter described and claimed.

In the drawings, Figure 1 is a side elevation of my improved friction-clutch. Fig. 2 is a side elevation from the opposite side of the clutch, with a part broken away to show the internal arrangement. Fig. 3 is a side elevation of the clutch open, showing some of the parts; and Fig. 4 is a transverse section taken in the line 4 of Fig. 1, looking in the direction of the arrow.

In making my improved friction-clutch for converting reciprocating into rotary motion I mount the wheel A on the shaft which it is intended to rotate and fix the same thereto, so that it and the shaft will rotate together. This wheel is provided with a projection or flange B, extending at right angles to the body of the wheel, so as to afford a bearing to produce the friction necessary to rotate it. Within the space or chamber formed by the flange B, I arrange a ring C, that extends entirely around it, except that a space is provided in it at one point to insert a lever to force the ends apart and cause it to expand. This ring is made of any suitable material having some elasticity, so that it is capable of being expanded by springing the ends apart and of contracting when the prying pressure is released. It is intended to rest immediately within the bearing B, so that when the ends are pried apart and it is caused to expand it will bear against the inside of the bearing with sufficient force to cause them to move together by the frictional contact thus secured. So great is the frictional contact thus secured between the ring and the wheel A that the one will move the other with it, even though the surface between the two be oiled or lubricated. A plate or disk D is also arranged on the shaft, but loosely, so that it may be oscillated thereon. This plate is intended to be of a size to cover or fit over the space or chamber within the flange or bearing B of the wheel A. It is also preferably provided at one side with an extension or pivotal point E, to which the reciprocating rod or bar may be connected. On the outside of this plate is arranged a ring or flange F, which may be shifted to different positions on it and held at any desired position by means of a pin G, whose inner end engages with a hole *g* in the plate or disk E. It is also preferably provided with a handle H to enable it to be shifted as desired. On the ring or flange F, and preferably at the side opposite to the handle H, I arrange pins I, which extend down through slots J in the plate or disk D. These pins are provided with springs K, bent, preferably, into something like a U form. The disk D is provided with a hub D', which extends down against the wheel A. In this hub is arranged a notch *d*, and a lever L extends from this notch out through the space left in the expansible ring C. One of the springs K bears against the sides of this lever and tends to hold its outer end in that position that will prevent it from prying the ends apart and expanding the ring. As the plate D, however, is carried back and forth in its reciprocating movement, it alternately bears upon the inner end of the lever L. When it bears against it in that direction which compresses the spring, it moves the lever out of a line that would correspond to a radius of the shaft projected through the axis of the lever. This causes the outer end of the lever to pry the ends of the ring apart, and thus expand it. When, however, the disk moves in the direction in which the tension of the spring is exerted against the lever, so that they are both bearing upon the lever from the same side and in one direction, the lever is retained on approximately a line that would correspond with a radius of the shaft projected through the axis of the lever. This prevents the prying of the ends of the ring apart and permits it to contract, so that the disk and ring slide around together. As the ring is thus alternately expanded and released from expansion, so as to move with the wheel A in one direction and slip back in the other for a new hold, a constant rotary movement will be imparted to the wheel A. As shown in Fig. 2, I have arranged springs K on each side of the lever L. When the rotation is intended to be in one direction only, but one of these springs is brought into operation. When, however, it is desired to change the direction of the rotation of the wheel A, the position of the disk F may be shifted through means of the pin G and the holes g, so that the other spring is brought against the opposite side of the lever. This shifting will of course cause the spring which had been against the lever to be moved away from it, so that it will be operated upon by the spring at the opposite side. This will cause the lever L to be tipped in the other direction, so that the ring will be pried open and expanded when the disk D is moving in the direction opposite to which the lever opened and expanded the ring before. In this way a reverse rotary movement will be imparted to the wheel A. A collar M may be arranged on the shaft to hold the parts securely together in place.

From the above explanation of the construction and operation of my improved clutch it will be seen that the important idea or principle of my invention consists in the arrangement of a clutch that may be united and moved with the wheel on a shaft by the employment of an expansible incomplete ring, which is caused to expand by moving a lever within its ends to a position slightly to one side of a line that can be represented by a radius of the shaft projected through the axis of the lever and permitting the ring to contract by moving the lever to and holding it in a position that approximates a line represented by such radius, and means for changing the expanding action of the lever to operate while moving in the one direction or the other, as it may be desired, to change the rotation of the wheel from one direction to the other. The special features of construction are intended to be subordinate to this idea and arrangement, and therefore I do not propose to limit myself to exact forms or features of construction.

What I regard as new, and desire to secure by Letters Patent, is—

1. In a friction-clutch, the combination of a wheel rotatable with the shaft on which it is mounted, an expansible ring frictionally united and moving with the wheel when expanded and independently of it when non-expanded, a reciprocating disk mounted loosely on the shaft, a lever connecting the disk and the ring and expanding the ring as the disk moves in one direction and allowing it to contract as it moves in the other direction, and means for reversing the operation of the lever to cause it to expand the ring while moving in the one direction or the other, as it may be desired, to change the direction of rotation of the wheel, substantially as described.

2. In a friction-clutch, the combination of a wheel rotatable with the shaft on which it is mounted, an expansible ring frictionally united and moving with the wheel when expanded and independently of it when non-expanded, a reciprocating disk mounted loosely on the shaft, a lever connecting the disk and the ring and moved by the disk in one direction out of a line with a radius of the shaft projected through the axis of the lever to pry the ends of the ring apart to expand it, and flexible means for holding the lever approximately on a line with a radius of the shaft projected through the axis of the lever as the disk moves in the other direction to permit the ring to contract, substantially as described.

SAMUEL E. NUTTING.

Witnesses:
THOMAS A. BANNING,
JAMES W. HEDENBERG.